Nov. 28, 1961     F. L. FISCHER     3,010,327
GYROSCOPIC APPARATUS

Filed March 1, 1956     2 Sheets-Sheet 1

INVENTOR.
FRANZ L. FISCHER
BY
*Kenyon & Kenyon*
ATTORNEYS

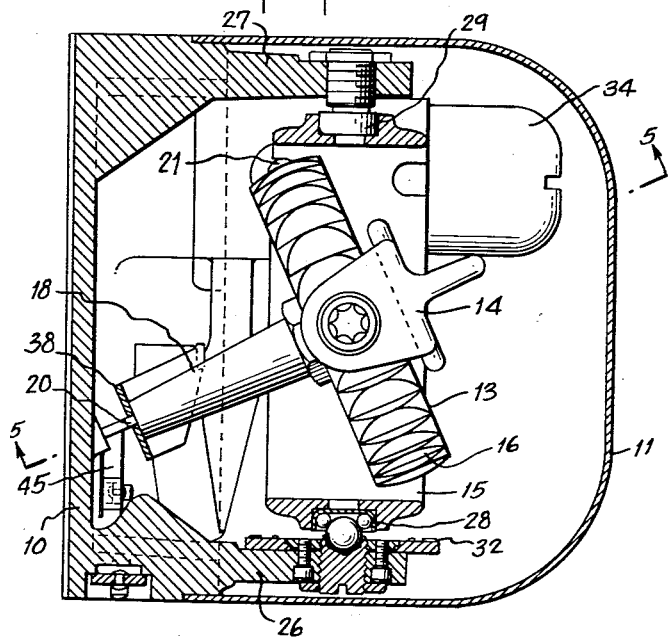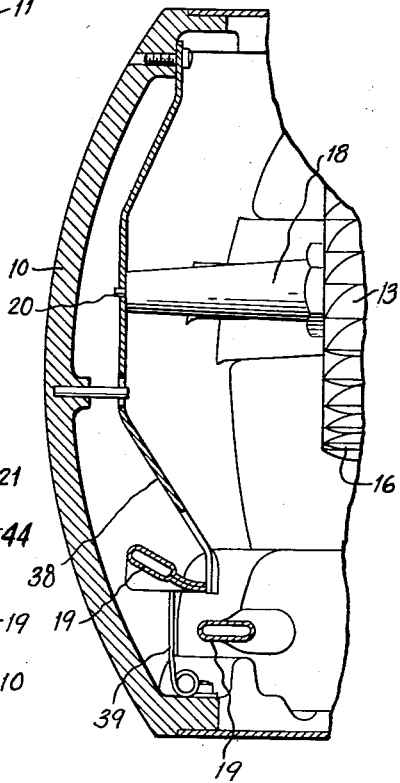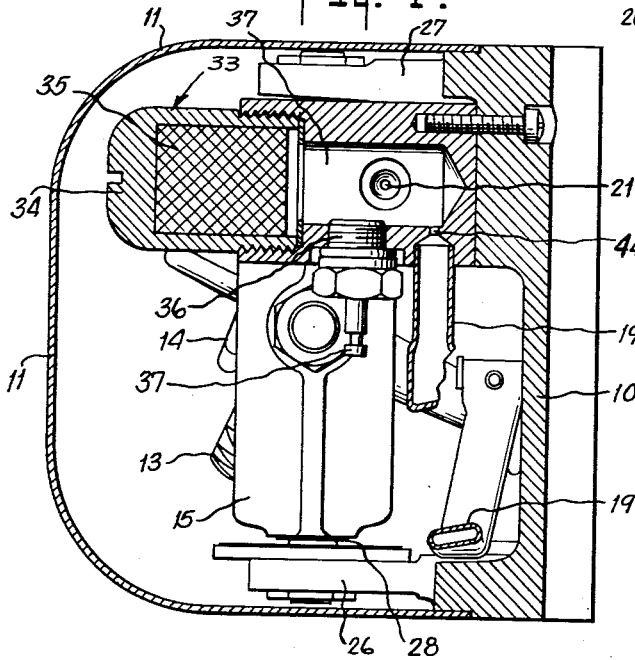

United States Patent Office 3,010,327
Patented Nov. 28, 1961

3,010,327
GYROSCOPIC APPARATUS
Franz L. Fischer, Jackson Heights, N.Y., assignor to Bulova Research and Development Laboratories, Inc., Woodside, N.Y., a corporation of New York
Filed Mar. 1, 1956, Ser. No. 568,939
8 Claims. (Cl. 74—5.12)

The present invention relates generally to gyroscopic apparatus for roll stabilization and more particularly to a mechanism for locking the gimbals of a gyroscope until the rotor thereof is brought up to speed, the locking mechanism being automatically retracted when the motive force initiating spinning of the rotor is spent.

In gyroscopically-controlled missiles, such as torpedoes, the gimbals of the gyroscope must be locked relative to the body of the torpedo until the torpedo is launched. When launching the missile, motive power, such as an air jet, is provided for imparting a rapid spinning movement to the gyro rotor and after a predetermined interval during which the rotor is brought up to the desired speed, the motive power is cut off.

It is the principal object of this invention to provide an improved mechanism for locking the gimbals of a gyroscope until the rotor is brought up to speed and for thereafter releasing the locking means so that the gyroscope can perform its normal function.

More specifically, it is an object of the invention to provide an electrically-ignited propellant charge which is exhausted through a nozzle directed at blades cut on the periphery of the gyro motor to drive it up to speed in a matter of seconds whereby the rotor is usable as a space reference while the gyro wheel is coasting.

Also an object of the invention is to provide a Bourdon tube responsive to the pressure developed by the propellant charge and adapted to actuate a locking mechanism automatically to uncage the gyro wheel when the propellant charge is spent.

Still another object of the invention is to provide an electrical circuit which is automatically closed when the gyro is uncaged, the circuit thereby indicating that the unit is ready for operation.

Yet another object of the invention is to provide a gyro wheel structure supported on a single ball bearing, whereby the need for adjusting end play is obviated.

It is a further object of the invention to provide gyroscopic apparatus of simple, efficient and reliable design and of inexpensive construction.

For a better understanding of the invention as well as other objects and further features thereof, reference is had to the following detailed description to be read in conjunction with the accompanying drawings wherein like components in the several views are identified by like reference numerals.

In the drawing:

FIGURE 3 is a transverse sectional view taken through the plane indicated by lines 3—3 in FIGURE 1.

FIGURE 4 is a transverse secondary view taken through the plane indicated by lines 4—4 in FIGURE 1.

FIGURE 5 is a sectional view taken through the plane indicated by lines 5—5 in FIGURE 3.

Figure 1:
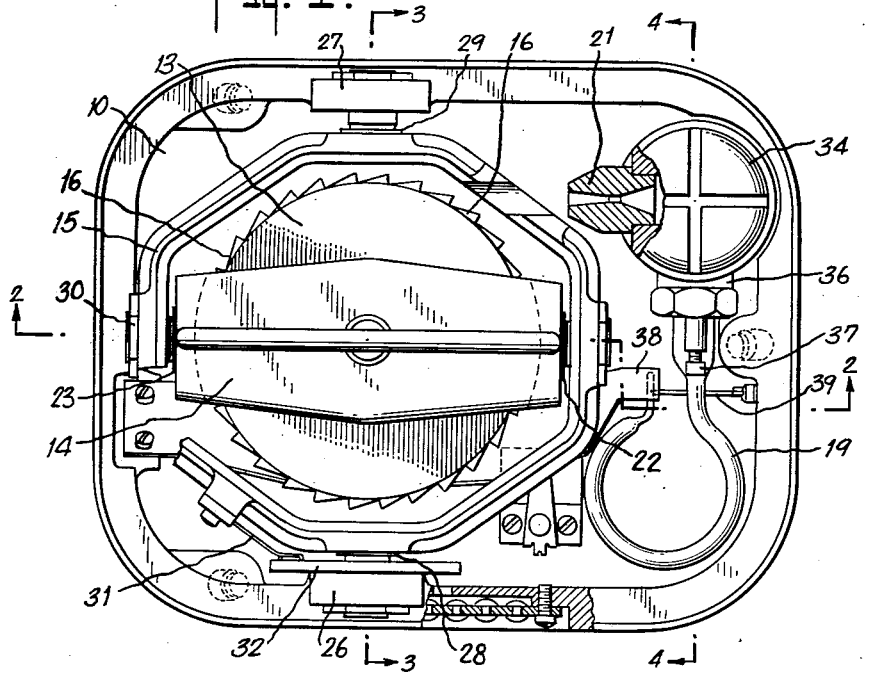
FIGURE 1 is a plan view of a gyroscope unit in accordance with the invention, the unit being shown in flight position with the cover removed.

All components of the gyro unit are supported on a base 10, the unit being enclosed by a cover 11 which serves to protect the components against environmental dirt and moisture. The major components of the gyroscope comprise a rotor 13 mounted within a yoke-shaped inner gimbal 14, which is in turn rotatable within an outer gimbal 15.

As best seen in FIGURES 1 and 3, the rotor wheel 13 is provided at its periphery with an annular row of paddles or blades 16 upon which a jet of gas may be directed to impart a rotary force setting the wheel into spinning motion. Inserted in the hub of rotor 13 is a single ball bearing 17, the rotor wheel being held in position within the inner gimbal 14 by means of a spindle 18, only one end of which is threadably received in the inner gimbal 14. The free end of the spindle is tapered and terminates in a pin 20. Spindle 18 also acts to cage the inner and outer gimbals in a position such that the blades 16 on the gyro wheel are aligned with a nozzle 21.

Figure 2:
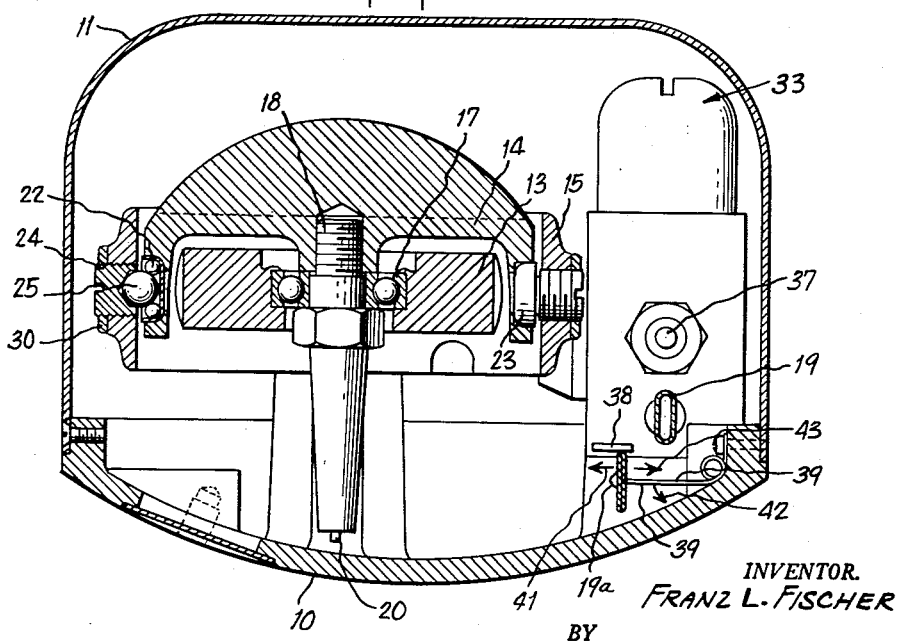
FIGURE 2 is a longitudinal sectional view of the unit taken through the plane indicated by lines 2—2 in FIGURE 1.

As best seen in FIGURE 2, inner gimbal 14 is pivotally mounted within the outer gimbal 15 by means of ball bearings 22 and 23 disposed at diametrically opposed ends of the inner gimbal. End play adjustment of the inner gimbal is obtained, as shown in connection with bearing 22, by advancing or retracting a set screw 24 inserted in a threaded bore in outer gimbal 15 and containing a ball 25 which engages ball bearing 22. The end play adjustment is set by means of a locking nut 30.

As shown in FIGS. 1 and 3, the outer gimbal is pivotally supported between upright standards 26 and 27 affixed to base 10, the outer gimbal being provided at diametrically opposed positions with ball bearings 28 and 29. End play adjustment of the outer gimbal is obtained by set screws and balls in the same manner as with the inner gimbal. The axis of spindle 18 is perpendicularly disposed with respect to the axial line connecting the bearings of inner gimbal 14, this line in turn being perpendicularly disposed relative to the axial line connecting the bearings of the outer gimbal 15.

Attached to the outer gimbal ring 15 at a point adjacent ball bearing 28 is a double brush assembly 31, the brushes being electrically interconnected. Brushes 31 ride on separate annular paths formed on a printed circuit potentiometer 32 disposed on standard 26 coaxially with respect to ball bearing 28. A voltage source is connected to the outer ring of the potentiometer which thereby supplies power through the interconnected brushes to the inner ring of potentiometer. The inner ring is formed of conductive material, whereas the outer ring includes a portion of resistive material spread over a predetermined arc such that the magnitude of voltage established at the point thereon engaged by the brush is a function of the angular position of the outer gimbal. Indicator means are connected between the inner ring and the junction of oppositely polarized direct-current sources connected between the ends of the outer ring. Thus a proportional signal is given when the gyro is displaced in roll.

A motive power source for the gyro is constituted by a combustion chamber 33 having a head section 34 communicating with nozzle 21 and containing a propellant charge 35. Contained in the combustion chamber 33 is a squib 36 which is electrically ignited by applying a potential to terminal 37. The ignition of the squib which in turn sets off the propellant charge which burns at an even rate thereby raising the chamber pressure. In a practical embodiment the charge may burn for approximately two seconds causing a chamber pressure of approximately 100 atmospheres. This pressure is released through nozzle 21 and is projected at the blades 16 on the periphery of the gyro wheel, to cause rotary motion thereof. Attached to the lower end of the combustion chamber 33 is a Bourdon tube 19 which is caused to expand by the increased pressure in the combustion chamber resulting from burning of the propellant charge.

As best seen in FIGS. 2 and 5, the operative end of the Bourdon tube is forced below a flat caging spring 38 by means of a latch spring 39 whose wire end is received within a dimple 19a formed in the free end of the Bourdon tube. As shown in FIG. 5, caging spring 38 is provided with an opening accommodating the terminal pin 20 of spindle 18, the caging spring being held in place by the free end of Bourdon tube 19 which rests thereunder. Thus the spindle 18 cannot be shifted and the gyro is latched.

The expansion of Bourdon tube 19 causes the free end thereof to shift inward, in the direction indicated by arrow 41, under the caging spring 38. The inward movement permits latch spring 29 to fall out of place in the direction indicated by arrow 42, so that the free end of the Bourdon tube is now able to move in either direction. Upon the burn-out of the propellant charge, the Bourdon tube 19 is delayed a few milliseconds from assuming its normal position in the direction indicated by arrow 43, this being accomplished by a throttle 44 interposed between the combustion chamber and the end of the Bourdon tube coupled thereto. After reaching its normal position, the free end of the Bourdon tube no longer rests under the caging spring 38, thereby permitting same to fall downwardly and free pin 20. Thus spindle 18 is released and the inner and outer gimbals are uncaged. When caging spring 38 drops, it engages an electrical contact 45 which closes an electrical circuit to the outside serving to provide a signal that the gyro is now ready for use. The gyro now has sufficient stability to be used as a space reference for a time period roughly of ⅓ to ½ of the coast down time.

While it has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A roll stabilization gyroscope comprising a gyro wheel having peripheral blades, a universally mounted spindle rotatably supporting said wheel, a combustion chamber containing a propellant charge and provided with a nozzle directing pressurized gas onto said blades to set said wheel in spinning motion, releasable means independent of said nozzle to cage said spindle, and means responsive to the pressure developed in said chamber to release said caging means after said charge is spent and said wheel is in spinning motion, said pressure responsive means including an element which moves in one direction upon an increase in pressure in said chamber and moves in the reverse direction upon a fall in pressure therein and means coupled to said element and operative only in response to said reverse movement to effect the release of said caging means.

2. A roll stabilization gyroscope comprising a gyro wheel having peripheral blades, a universally mounted spindle rotatably supporting said wheel, a combustion chamber containing a propellant charge and provided with a nozzle for directing pressurized gas onto said blades to set said wheel in motion, means releasably to cage said wheel, a Bourdon tube coupled at one end to said chamber and responsive to the pressure therein, said tube moving in one direction in response to an increase in chamber pressure and in the reverse direction upon a fall in pressure therein, and means coupling the free end of said tube to said caging means and operative only upon a reverse movement of said tube to release said caging means when said charge is spent and said wheel is in spinning motion.

3. A roll stabilized gyroscope comprising a gyro wheel having peripheral blades, a spindle having one end secured to a universally mounted inner gimbal and rotatably supporting said wheel, a combustion chamber containing a propellant charge and provided with a nozzle for directing pressurized gas onto said blades to set said wheel in motion, means engageable with the free end of said spindle releasably to cage said spindle, and a Bourdon tube coupled at one end to said chamber and responsive to the pressure therein, said tube moving in one direction in response to an increase in chamber pressure and in the reverse direction upon a fall in pressure, said tube being coupled to said caging means to release same when said charge is spent.

4. A roll stabilized gyroscope comprising an outer gimbal, an inner gimbal pivotally mounted within said outer gimbal, a gyro wheel rotatably supported on a spindle within the inner gimbal and being provided with peripheral blades, a combustion chamber having propellant charge means therein and including a nozzle for directing a gas stream at said blades to set said wheel in motion, releasable spring means to lock said spindle, a Bourdon tube having one end thereof coupled to said chamber whereby increased gas pressure therein effects expansion of said tube to effect movement thereof in one direction, said tube moving in the reverse direction upon a decrease in gas pressure, and means operatively coupling said tube to said spring means to release same only upon said reverse movement of said tube thereby to uncage said spindle when said charge is spent.

5. A roll stabilized gyroscope comprising an outer gimbal, an inner gimbal pivotally mounted within said outer gimbal, a gyro wheel having peripheral blades, a spindle having one end affixed to said inner gimbal for rotatably supporting said gyro wheel therein, a combustion chamber provided with a head containing a propellant charge and including a nozzle directed at said blades to set said wheel in motion, a caging spring arranged to engage the other end of said spindle to lock said spindle and thereby cage said gimbals, a Bourdon tube having one end coupled to said chamber whereby increased gas pressure therein tends to displace the free end of said tube, and a latch spring urging the free end of said tube under said caging spring to maintain an engaging relationship with said spindle, said latch spring dropping out upon displacement in one direction of said tube in response to increased chamber pressure thereby permitting said free end thereof to shift in the reverse direction upon a reduction in gas pressure when said charge is spent to release said caging spring and free said spindle.

6. A roll stabilized gyroscope comprising an outer gimbal, an inner gimbal pivotally mounted within said outer gimbal, a gyro wheel having peripheral blades, a spindle having one end affixed to said inner gimbal, a single hub bearing for rotatably supporting said gyro wheel on said spindle, a combustion chamber provided with a head containing a propellant charge and including a nozzle directed at said blades to set said wheel in motion, a caging spring arranged to engage the other end of said spindle and pre-loaded in a direction to disengage and thereby unlock said gimbals, a Bourdon tube having one end coupled to said chamber whereby increased gas pressure therein tends to displace the free end of said tube, and a latch spring urging the free end of said tube under said caging spring to maintain an engaging relationship with said spindle, said latch spring dropping out upon displacement of said tube in response to increased chamber pressure thereby permitting said free end thereof to shift in the reverse direction upon a reduction in gas pressure when said charge is spent to release said caging spring and free said spindle.

7. A roll stabilized gyroscope comprising an outer gimbal, a yoke-shaped inner gimbal pivotally mounted within said outer gimbal, a gyro wheel having peripheral blades, a spindle having one end affixed to said inner gimbal for rotatably supporting said gyro wheel therein, a combustion chamber provided with a head containing a propellant charge and a squib for igniting said charge and including a nozzle directed at said blades to set said wheel in motion, a caging spring arranged to engage the other end of said spindle and pre-loaded in a direction to disengage and thereby unlock said gimbals, a Bourdon tube having one end coupled to said chamber whereby increased gas pressure therein tends to displace the free end of said tube, a latch spring urging the free end of said tube under said caging spring to maintain engagement with said spindle, said latch spring dropping out upon displacement of said tube in response to increased chamber pressure thereby permitting said free end thereof to shift in the reverse direction upon a reduction in gas pressure when said charge is spent to release said caging spring and free said spindle, and an electrical switch operative to signal the uncaging of said gyroscope and positioned to be actuated by said caging spring when said caging spring disengages from said spindle.

8. A gyroscope, as set forth in claim 7, further including a throttle interposed between said chamber and said Bourdon tube to delay the action of the latter.

References Cited in the file of this patent
UNITED STATES PATENTS

| | | |
|---|---|---|
| 1,077,344 | Hennig | Nov. 4, 1913 |
| 1,192,532 | Klahn | July 26, 1916 |
| 1,589,545 | Newkirk | June 22, 1926 |
| 1,959,309 | Smith | May 15, 1934 |
| 2,415,899 | Meyer et al. | Feb. 18, 1947 |
| 2,752,684 | Bentley | July 3, 1956 |